(12) United States Patent
Millauer

(10) Patent No.: US 6,576,131 B1
(45) Date of Patent: *Jun. 10, 2003

(54) PROCESS AND APPARATUS FOR CHANGING THE WETTING AGENT OF PIGMENTS

(75) Inventor: Christian Millauer, Niederuzwil (CH)

(73) Assignee: Flint Ink Corporation, Ann Arbor, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,572

(22) Filed: Dec. 16, 1997

(51) Int. Cl.[7] ............................................. B01D 3/00
(52) U.S. Cl. ..................................... 210/634; 210/767
(58) Field of Search ..................... 210/633, 634, 210/767; 422/243, 286, 309; 264/102, 40.7, 37.32

(56) References Cited

U.S. PATENT DOCUMENTS

| | | | |
|---|---|---|---|
| 2,985,909 A | | 5/1961 | Smith et al. |
| 3,035,306 A | * | 5/1962 | Rossiter ..................... 100/37 |
| 3,070,836 A | | 1/1963 | DeHaven et al. |
| 3,195,178 A | | 7/1965 | Carton et al. |
| 3,235,640 A | | 2/1966 | Carton et al. |
| 3,742,093 A | | 6/1973 | Skidmore |
| 3,802,670 A | | 4/1974 | Okada et al. |
| 3,873,474 A | | 3/1975 | Ficker |
| 3,917,507 A | * | 11/1975 | Skidmore |
| 3,993,292 A | | 11/1976 | Skidmore |
| 4,054,271 A | | 10/1977 | Lanzillo |
| 4,300,954 A | | 11/1981 | de Monterey et al. |
| 4,309,223 A | | 1/1982 | Rouwhorst et al. |
| 4,431,598 A | * | 2/1984 | Korpman |
| 4,443,591 A | * | 4/1984 | Schmidt et al. |
| 4,446,094 A | | 5/1984 | Rossiter |
| 4,474,473 A | | 10/1984 | Higuchi et al. |
| 4,659,300 A | | 4/1987 | Schwarz |
| 4,663,103 A | * | 5/1987 | McCullough et al. |
| 4,722,680 A | * | 2/1988 | Rossberger et al. ......... 425/203 |

(List continued on next page.)

FOREIGN PATENT DOCUMENTS

| | | | |
|---|---|---|---|
| DE | 915689 | * | 6/1954 |
| DE | 3248659 | * | 7/1984 |
| DE | 4446129 | | 6/1995 |
| EP | 0 255 667 A1 | | 7/1987 |
| FR | 81735 | * | 9/1963 |
| GB | 1431978 | | 4/1976 |
| GB | 2 034 628 | | 6/1980 |
| JP | 57053568 | | 3/1982 |
| JP | 5051532 | | 3/1993 |

Primary Examiner—W. L. Walker
Assistant Examiner—Terry K. Cecil
(74) Attorney, Agent, or Firm—Harness, Dickey & Pierce, P.L.C.

(57) ABSTRACT

The present invention relates to a process where a wetting agent of solids, such as pigments, is to be changed from a first (e.g. aqueous) agent of a lower affinity to the solids to a second (e.g. oily) agent of a higher affinity to the solids. Solids, e.g. pigments, and agents are introduced into an extruder at a predetermined volume rate per time unit. The extruder includes an extruder barrel, with at least one screw which has screw threads over its length, a helical space between adjacent screw threads, and a drive for rotating the screw at a predetermined speed. The supply rate and the discharge speed of the extruder screw are selected in such a manner as to fill only part of the space between adjacent screw threads by solids and by the first and second agents, thereby retaining a free helical space to allow the first agent to segregate. At least one lateral opening is provided in the barrel for the first agent to escape.

13 Claims, 2 Drawing Sheets

U.S. PATENT DOCUMENTS

| | | |
|---|---|---|
| 4,776,269 A | 10/1988 | Coggins et al. |
| 4,789,507 A * | 12/1988 | Wesley et al. |
| 4,830,801 A * | 5/1989 | Rossberger et al. .......... 264/102 |
| 4,943,402 A | 7/1990 | Kafka et al. |
| 5,151,026 A | 9/1992 | Andersen et al. |
| 5,160,441 A * | 11/1992 | Lundquist .................... 210/781 |
| 5,205,930 A * | 4/1993 | Obrestad ..................... 210/251 |
| 5,232,649 A * | 8/1993 | Andersen et al. ....... 264/211.23 |
| 5,417,854 A * | 5/1995 | Day et al. .................... 210/208 |
| 5,466,370 A * | 11/1995 | Day et al. .................... 210/298 |
| 5,480,541 A * | 1/1996 | Day et al. ................. 210/198.1 |
| 5,480,756 A * | 1/1996 | Mahabadi et al. |
| 5,489,381 A * | 2/1996 | Day et al. .................... 210/302 |
| 5,743,948 A | 4/1998 | Laszewski et al. .......... 106/244 |
| 5,756,659 A * | 5/1998 | Hughes et al. |

* cited by examiner

PROCESS AND APPARATUS FOR CHANGING THE WETTING AGENT OF PIGMENTS

BACKGROUND OF THE INVENTION

1. Field of the invention

This invention relates, in general, to a process for changing the wetting agents of solids, and more particularly, to a process for changing the wetting agent of pigments.

2. State of the Art

Pigments are typically produced in an aqueous phase to diminish handling problems. However, as a final product, the pigments are, generally, desired to be in an oily phase. It is known to dry pigments before contacting them with the desired oily agent. However, this method is relatively expensive.

When removal of a liquid from a solid phase is required, it is common to use compression forces exerted onto the mixture. Examples can be found in U.S. Pat. Nos. 5,417,854; 5,466,370; 5,480,541 and 5,489,381. U.S. Pat. Nos. 5,151,026 and 5,232,649 disclose extracting a liquid from polymers or rubber materials by an extruder. If one would apply such an extruder for drying pigments or other solid material to separate the solid phase, the expenses would again be high, because time and energy has to be invested for subsequently contacting the pigments or other solid material with the oily agent.

Other examples of using compression forces to separate solids from liquids can be found in U.S. Pat. No. 5,160,441; U.S. Pat. No. 5,205,930; U.S. Pat. No. 3,035,306; and U.S. Pat. No. 4,474,473.

U.S. Pat. No. 4,474,473 also discloses use of compressive forces, and teaches using a screw having relatively shallow channels, and including special screws having deep channels only in a middle part of the barrel. The use of shallow channels, with practically no free space within these channels, limits the effectiveness with which water is removed via a vent 15. That is, in the vicinity of vent 15, there is only limited opportunity to remove water which may have been trapped in the material.

SUMMARY OF THE INVENTION

It is an object of the present invention to provide a more time and cost effective process of separating liquid and solid phases.

It is a further object to change the wetting agent in a three phase system, where a solid phase is dispersed in a first aqueous liquid phase which is exchanged with a second, oily phase.

These and other objects are achieved in a first inventive step with the recognition that oily matters have normally a higher adherence to solid matters than water.

In a second step, a conventional extruder can be used in a conventional manner to separate the solid phase from the first aqueous liquid phase, where the extruder applies three compression forces on a pinch point of the material. However, it was found that compressing material from three sides does not optimally effect liquid extraction when a three-phase system is used, i.e. a first phase of solid pigments, a second aqueous phase and a third, oily phase. In an investigation of this phenomenon, it was discovered that compressing material from three sides entraps water within the mass, not allowing it to escape. Although additional water extraction stages can be provided for serially extracting water from the material, exemplary embodiments of the present invention are directed to avoiding the time and expense of these additional stages.

Known extruders exert one of the three aforementional forces using an auxiliary extruder extending laterally and perpendicularly to the main extruder. This auxiliary extruder rotates in a barrel which has a feeding hopper. Thus, part of the material to be dried is introduced through this auxiliary extruder. Under these conditions, one of two problems will result: either the auxiliary extruder is of a different length then the main extruder, such that material to be introduced through the auxiliary extruder is treated with a different intensity (that is, different time and/or pressure) than the material which is introduced via the main extruder; or, if the material is to be treated over the same period of time as the material in the main extruder, the auxiliary extruder is about the same length as the main extruder from the supply hopper up to the point where the auxiliary extruder feeds material and exerts one of the three aforementioned forces. The first configuration, with a shorter auxiliary extruder, results in an unequal treatment of the material and thus, an inhomogeneous product of undesirable quality. The second configuration renders the system extremely expensive, cumbersome and space wasting. If, according to such a conventional extruder, further auxiliary extruders have to be arranged downstream, their length must increase accordingly.

Further investigations led to the surprising discovery that all difficulties can be avoided if the rate of introduction of the materials and the speed of the extruder screw (or screws) are selected in such a manner that only part of the space between the adjacent screw threads receive solutions, thus leaving a free space for the aqueous phase to escape. Moreover, it has been found that, although the invention can be used where the solid phase is formed by pigments, particularly for inks, it can be utilized to change the respective liquid phase regardless of the solid phase. Likewise, the liquid phases can be of any type, provided one of at least two such phases has a greater affinity to the solids than the other.

The foregoing is supported by the kneading and shearing effect of the extruder screw within its barrel. This effect on the one hand, provides an intimate contact between the solids, particularly the pigments, and the oily phase, thus releasing water from their surfaces, while the kneading and shearing action ensures that any entrapped water is moved to the free outer surface of the mass where it escapes through at least one lateral opening of the barrel which will not be jammed by compressed material, as is the case with conventional extruders.

BRIEF DESCRIPTION OF THE DRAWINGS

Further details of the invention will become apparent from the following description of preferred embodiments schematically illustrated in the drawings wherein.

DETAILED DESCRIPTION OF THE PREFERRED EMBODIMENTS

Figure 1:
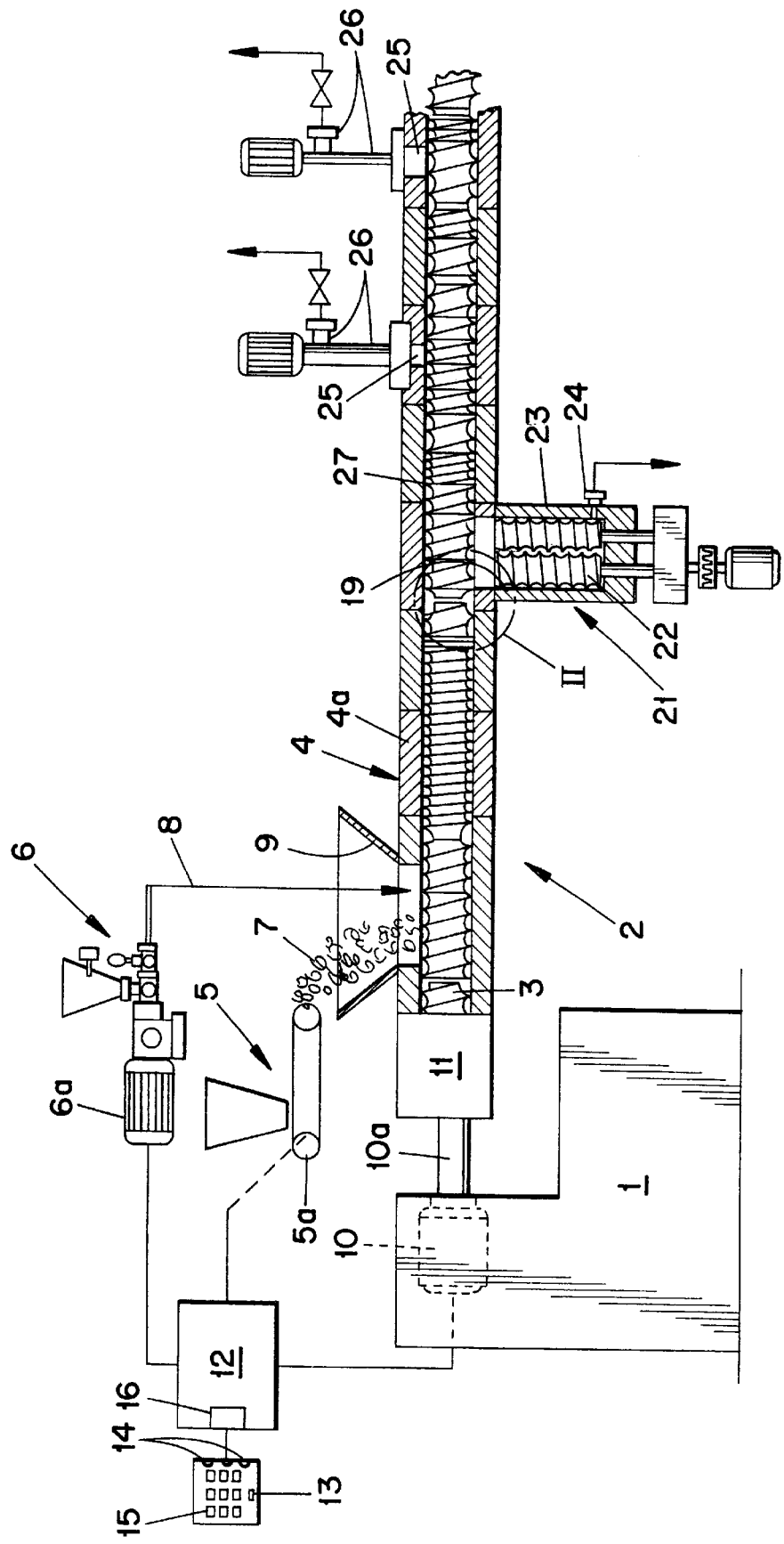
FIG. 1 is a side elevation of an exemplary extruder, partially in a longitudinal cross-section, wherein an exemplary process according to the invention can be implemented.

FIG. 1 shows part of a frame 1 which contains a motor 10 (indicated in dotted lines) and control devices of an extruder 2 comprising at least one screw 3 which is located within a modular barrel 4 having modules (such as module 4a). The extruder barrel has at least a top side and a bottom side. Although in the side elevation shown only one screw 3 is visible, at least a second screw can be included behind the screw 3 so that the extruder 2 can be a twin-screw extruder with, for example, intermeshing threads of both screws. The extruder has a supply input and a discharge output, and can convey material in a predetermined direction from the input to the output. A twin-screw extruder can provide a more intense kneading, mixing and shearing action, on the one hand, and a more uniform conveyance of the material, on the other hand.

Such material comprises at least two components: i.e., a mixture 7 of a solid phase and a first agent (e.g., an aqueous phase), such as a mixture formed as a wet pigment cake after milling the pigments by, for example, an agitator mill; and a second agent, such as a liquid phase 8 having a greater affinity to the solids of the mixture than the aqueous phase. The mixture of a solid and a first agent (e.g., water) is supplied by a first metering device 5. The liquid phase 8, which is, for example, an oily phase, such as a varnish, is supplied by a second metering device 6. It should be noted that the mixture 7 and the liquid phase 8 can be introduced separately into a hopper 9 or other supply opening of the extruder 2, although they can also be previously mixed and supplied in common. Furthermore, it will be clear to those skilled in the art that further phases, especially liquid phases, can be introduced into the extruder 2 either through the hopper 9 or downstream via a further supply opening in the extruder barrel 4. For example, an alkyd phase can be added through an opening in the second module 4*a* of the extruder barrel 4. Since it might be that part of the liquid phase 8 is lost during the treatment described in the following, or that it is suitable to add only part of the liquid phase 8 before water of the mixture 7 is expelled, some of the liquid phase (and/or some additive) can be added at the end of the extruder 2 which is broken away in FIG. 1.

As mentioned above, the extruder 2 is driven by motor 10 in the housing or frame 1 which is effected via a drive shaft 10*a* and a gear-box 11 in any manner known in the art. The metering devices 5, 6 are also driven by respective motors (the motor of the device 5 being not shown). The device 5 can be driven via a drive roller 5*a*, and the device 6 via a motor 6*a*, although a single motor can be used to drive both devices and the drive for the devices 5, 6 can be derived through respective gears, such as variable gears. In this arrangement, the drives 5*a*, 6*a* determine the amounts of mixture 7 and liquid phase 8 supplied to the extruder 2 by introducing them at, for example, a predetermined volume rate per time unit, whereas the speed of the motor 10 determines the amount of material discharged by the extruder 2. Thus, the ratio of both amounts will determine the filling ratio of the extruder 2.

All drives 5*a*, 6*a* and 10 are interconnected by a control circuit 12 where any desired relationship of the drive speeds can be set via a keyboard 13. The keyboard 13 includes, for example, three switches 14 to activate a setting mode for each of the three respective drives; i.e., the motor drive for the shaft 10 and for the devices 5 or 6. Setting can be done via a numerical key field 15, and all nominal values set can be stored in a memory part 16 of the control circuit 12. For most cases, it will be sufficient to have an open loop control. However, a closed loop control can be implemented by providing any appropriate measuring equipment. For example, the amount of the mixture 7 and/or liquid phase 8 can be monitored either via volumetric and/or gravimetric sensors, e.g. arranged in the path between the devices 5, 6 and the hopper 9. Monitoring the volume can be implemented for reasons explained below with reference to spaces 17 and 17*a* of the extruder. A gravimetric control can be used assuming that a certain weight corresponds to a certain volume. Alternately, or in addition, sensor means can be provided for monitoring the load of the extruder 2 either by measuring its current consumption or the strain on its parts. Alternately, or in addition, sound frequencies produced by the extruder 2 can be measured and analyzed to provide closed loop control.

Figure 2:
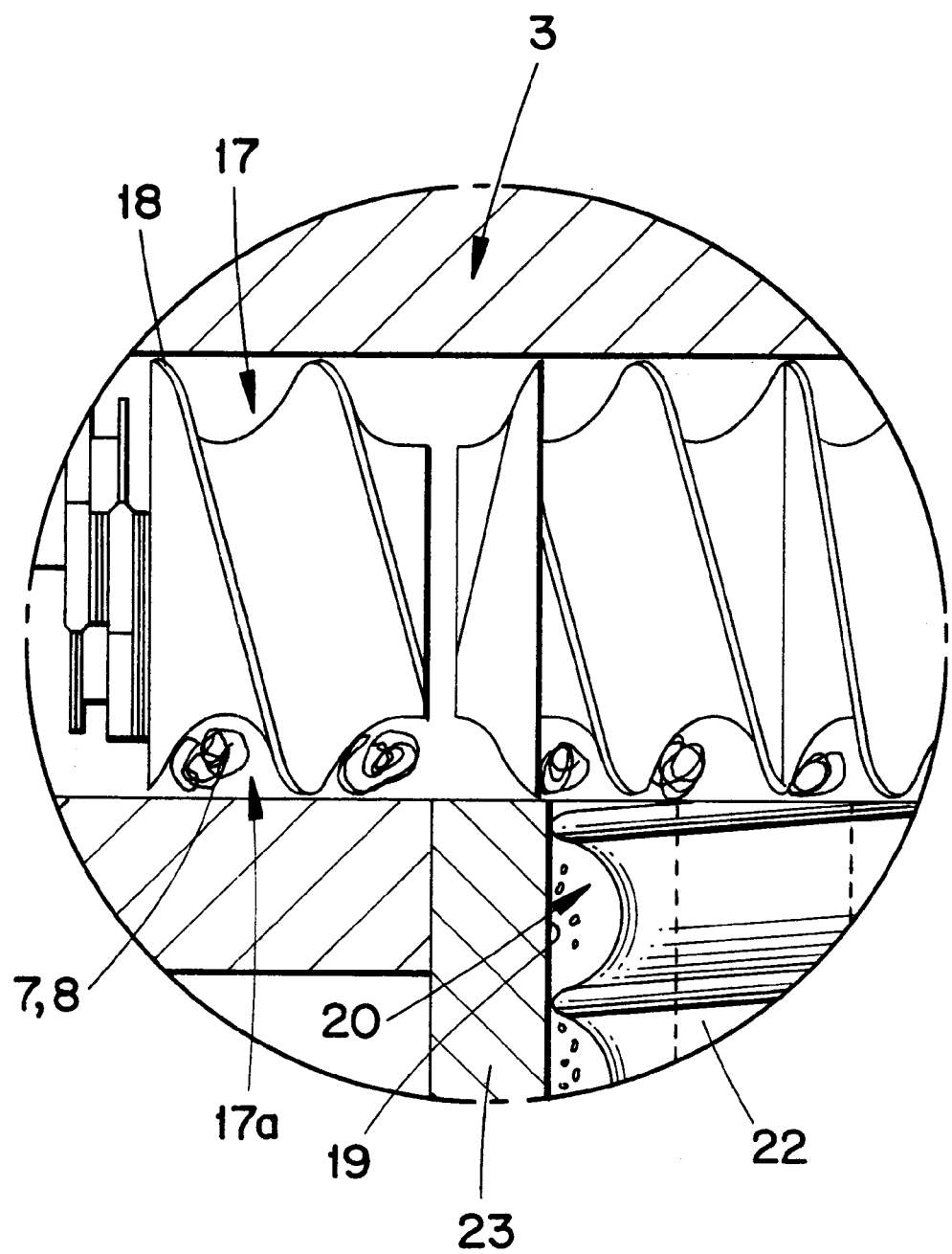
FIG. 2 shows the detail II of FIG. 1 on an enlarged scale.

As is apparent from FIG. 2, the drives 5*a*, 6*a* and 10 are set, in accordance with an exemplary embodiment of the invention, in such a manner that only part of a helical space 17 between adjacent threads 18 of the screw 3 is filled by the mixture 7 and liquid phase 8. The threads 18 of the screw 3 will thus apply shearing and kneading forces onto the mixture of material 7, 8 which will be rotated about the centers of the masses seen in cross-section in FIG. 2, thereby contacting the outer surface of the solids with the oily phase 8. Since this oily phase has a greater affinity to the surface of the solids and adheres much stronger on it than water, the latter will be driven out. If the spaces 17 were completely filled by the blend of material 7, 8 water would never have a chance to leave the material 7, 8, but would be entrapped in it. Therefore, the spaces 17 include the free helical space 17*a* where water can gather, thus being conveyed by the screw 3. This free space 17*a* can be as small as necessary to achieve a production rate as high as possible. It has been found that the free space 17*a* can amount to, for example, 50% of the whole space 17 between adjacent threads 18 in maximum, or any other desired percentage. For example, in some cases, 30% to 25% or even less will be enough.

FIG. 1 shows that the barrel 4 is provided with at least one lateral outlet opening 19 which can be in the bottom region of the barrel 4. This opening 19 is partially shown in FIG. 2. As soon as solids wrapped by the oily phase together with released aqueous phase (e.g., water) reach the opening 19, they will tend to leave the barrel 4 through the opening 19 at least in part. The aqueous phase will flow down through the opening 19, as indicated by arrows 20. In order to avoid the solid/liquid phase (e.g., solid/oily phase) mixture from escaping, it is suitable to provide some locking means which prevent escape of this solid-oily mixture while allowing escape of water. Such locking means can be a passive device, e.g. a fine meshed screen or a filter. However, because such passive devices tend to be clogged by the thicker solid-oily mixture, a dynamic locking device can be provided, i.e. a moving device which feeds the thicker mixture, as soon as it might enter the opening 19, back into the barrel 4 to be carried away by the screw 3. Such a dynamic locking device can, for example, be formed by an auxiliary extruder 21, which can also be a twin-screw extruder, and which is attached to the opening 19. The inevitable gap between the auxiliary extruder's screw 22 and its barrel 23 allows water to flow down in the direction of arrows 20 (FIG. 2), while the thick solid-oil mass is fed back into the barrel 4 as soon as it tends to enter the opening 19. As can be seen from FIG. 1, the barrel 23 of the auxiliary extruder 21 can have a water discharge opening or tube 24 at its bottom. This tube can also communicate with a suction pump so that at least a partial vacuum can be applied through the opening 19.

Depending on the type of solids used and the amount of water to be removed, it can be suitable to provide another arrangement of an opening 19 and a locking device 21 in a following one of the modules of barrel 4 downstream of opening 19. Another method of removing residual water includes applying a vacuum through respective upper openings 25 and pipes 26. Of course, such a vacuum or subpressure will be the more effective if the openings 25 are sealed against sucking most or all air via the near opening 19. In order to achieve such sealing, the inner space of the barrel can be provided with some partition walls which restrict the free cross-section and, thus form a kind of labyrinth seal. Alternately, or in addition, the screw 3 can be provided with some counter-threads 27 downstream the opening 19 and/or upstream the vacuum opening 25 so that material jams in this region and, thus, provides a self-sealing action due to compression of the solid phase and the second agent (e.g., conveying the solids and the second agent in a counter-direction, via use of counter threads 27, relative to a first predetermined direction in which the solids and the second agent are conveyed). It can be seen in FIG. 1 that the screw portion with the counter-threads 27 can be relatively short and can, for example, comprise as few as 1 to 5 threads. In the region of vacuum openings 25, pressure within the barrel can be reduced to a point where the residual water becomes gaseous or steam-like and can be sucked off. Alternately, a vacuum or suction openings can be provided of a bottom side of the extruder barrel.

It will be appreciated by those skilled in the art that the present invention can be embodied in other specific forms without departing from the spirit or essential characteristics thereof. The presently disclosed embodiments are therefore considered, in all respects, to be illustrative and non-restricted. The scope of the invention is indicated by the appended claims rather than the foregoing description, and all changes that come within the meaning and range and equivalence thereof are intended to be embraced therein.

What is claimed is:

1. A process for changing the wetting agent of pigment solids from a first agent that is an aqueous phase to a second agent that is an oily phase, said process comprising the steps of:

introducing said solids and said first and second agents into an extruder at a predetermined volume rate, said extruder including an extruder barrel having a supply input and a discharge output, at least one screw which has screw threads over its length, and helical spaces between adjacent screw threads, said at least one screw being arranged within said extruder barrel to extend from said supply inlet to said discharge outlet, providing at least one lateral opening in said extruder barrel between said supply inlet and said discharge outlet;

providing a portion of said screw downstream of said at least one lateral opening with at least one counter-thread so as to seal said helical spaces, rotating said at least one screw at a predetermined speed;

selecting said predetermined volume rate and said predetermined speed so as to fill only part of each of said helical spaces over the length of said screw from said supply inlet to said lateral outlet with solids and said first and second agents to segregate said first agent as to allow said first agent to escape through said at least one lateral outlet.

2. Process as claimed in claim 1, further comprising the step of:

re-introducing any mixture of said solids and said second agent which enter said at least one lateral opening back into said extruder barrel.

3. Process according to claim 2, wherein said step of re-introducing is carried out by an extruder reaching into said at least one lateral opening.

4. Process as claimed in claim 1, further comprising the step of:

vacuumizing said extruder barrel to suck said first agent from said barrel.

5. Process as claimed in claim 4, further comprising the step of:

sealing said helical spaces at a point downstream said at least one lateral opening, wherein said step of vacuumizing is downstream said point.

6. Process as claimed in claim 4, wherein said step of vacuumizing is performed on a bottom side of said extruder barrel.

7. Process as claimed in claim 1, wherein said first agent and said second agent are introduced separately to said extruder barrel.

8. Process as claimed in claim 1, wherein the part of said helical spaces which is filled is 50% or less of each helical space.

9. Process as claimed in claim 1, wherein said extruder is a twin-screw extruder.

10. Process as claimed in claim 1, wherein said at least one lateral opening is provided in a bottom side of said extruder barrel.

11. An apparatus useful for changing the wetting agent of pigment solids from a first agent that is an aqueous phase to a second agent that is an oily phase, comprising an extruder including:
       an extruder barrel having a supply input and a discharge output;
       at least one screw which has screw threads over its length, and
       helical spaces between adjacent screw threads, said at least one screw being arranged within said extruder barrel;
       at least one metering device for introducing said solids and said first and second agents into said extruder at predetermined volume rates;
       means for rotating said at least one screw at a predetermined speed;
       a controller for controlling said predetermined volume rates and said predetermined speed so as to fill only part of said helical spaces by said solids and said first and second agents to segregate said first agent; and
       at least one lateral opening in said extruder barrel for said first agent to escape;
    wherein a portion of said screw downstream of said at least one lateral opening has a sufficient number of counter-threads to cause said oily phase containing said pigment solids to jam.

12. An apparatus in accordance with claim 11, wherein said controller controls said predetermined volume rates and said predetermined speed to fill 50% by volume of said helical spaces.

13. An apparatus in accordance with claim 11, wherein said controller controls said predetermined volume rates and said predetermined speed to fill 25% to 30% by volume of said helical spaces.

* * * * *

UNITED STATES PATENT AND TRADEMARK OFFICE
CERTIFICATE OF CORRECTION

PATENT NO. : 6,576,131 B1
DATED : June 10, 2003
INVENTOR(S) : Christian Millauer It is certified that error appears in the above-identified patent and that said Letters Patent is hereby corrected as shown below:

Title page,
Item [*] Notice, "0 days" should be -- 582 days --.

Signed and Sealed this

Twenty-eighth Day of February, 2006

JON W. DUDAS
*Director of the United States Patent and Trademark Office*